(12) United States Patent
Devoe et al.

(10) Patent No.: US 6,822,847 B2
(45) Date of Patent: Nov. 23, 2004

(54) SINGLE LAYER CAPACITOR

(75) Inventors: Alan Devoe, La Jolla, CA (US);
Lambert Devoe, San Diego, CA (US);
Hung Trinh, San Diego, CA (US)

(73) Assignee: Presidio Components, Inc., San Diego, CA (US)

( * ) Notice: Subject to any disclaimer, the term of this patent is extended or adjusted under 35 U.S.C. 154(b) by 0 days.

(21) Appl. No.: 10/694,125

(22) Filed: Oct. 27, 2003

(65) Prior Publication Data

US 2004/0090733 A1 May 13, 2004

Related U.S. Application Data

(63) Continuation of application No. 10/188,696, filed on Jul. 2, 2002, now Pat. No. 6,661,639.

(51) Int. Cl.[7] .................. H01G 4/005; H01G 4/228; H01G 4/06
(52) U.S. Cl. .................. 361/303; 361/306.1; 361/311
(58) Field of Search ................ 361/303–305, 361/307, 309–313, 320, 301.1, 301.3, 301.4, 306.1, 306.2, 306.3, 308.1, 308.2, 308.3

(56) References Cited

U.S. PATENT DOCUMENTS

| | | | |
|---|---|---|---|
| 3,221,228 A | * 11/1965 | Carter et al. | 361/305 |
| 4,439,813 A | 3/1984 | Dougherty et al. | 361/321 |
| 4,819,128 A | 4/1989 | Florian et al. | 361/321 |
| 4,864,465 A | 9/1989 | Robbins | 361/321 |
| 4,881,308 A | 11/1989 | McLaughlin et al. | 29/25.42 |
| 5,177,663 A | 1/1993 | Ingleson et al. | 361/321 |
| 5,220,483 A | 6/1993 | Scott | 361/313 |
| 5,353,498 A | 10/1994 | Fillion et al. | 29/840 |
| 5,576,926 A | 11/1996 | Monsorno | 361/303 |
| 5,590,016 A | 12/1996 | Fujishiro et al. | 361/313 |
| 5,599,414 A | 2/1997 | Roethlingshoefer et al. | 156/89 |
| 5,712,758 A | 1/1998 | Amano et al. | 361/321.2 |
| 5,757,611 A | 5/1998 | Gurkovich et al. | 361/321.4 |
| 5,855,995 A | 1/1999 | Haq et al. | 428/210 |
| 6,088,215 A | 7/2000 | Webb et al. | 361/306.3 |
| 6,208,501 B1 | 3/2001 | Ingalls et al. | 361/303 |
| 6,661,639 B1 * | 12/2003 | Devoe et al. | 361/303 |

OTHER PUBLICATIONS

American Technical Ceramics, *ATC Millimeter Wavelength Single Layer Capacitors*, Brochure, 3 pp., Revised Feb. 1998.

Compex Corp, *MICROWAVE Chip Capacitors*, Brochure, 3 pp. publication, date unknown.

* cited by examiner

*Primary Examiner*—Eric Thomas
(74) *Attorney, Agent, or Firm*—Wood, Herron & Evans, LLP

(57) ABSTRACT

A monolithic or essentially monolithic single layer capacitor with high structural strength and capacitance. Sheets of green-state ceramic dielectric material and ceramic/metal composite material are laminated together, diced into individual chips, and fired to sinter the ceramic together. The composite material contains an amount of metal sufficient to render the composite conductive whereby the composite may be used for one or both electrodes and for mounting the capacitor to the pc board. Vertically-oriented surface mountable capacitors and hybrid capacitors are provided.

21 Claims, 6 Drawing Sheets

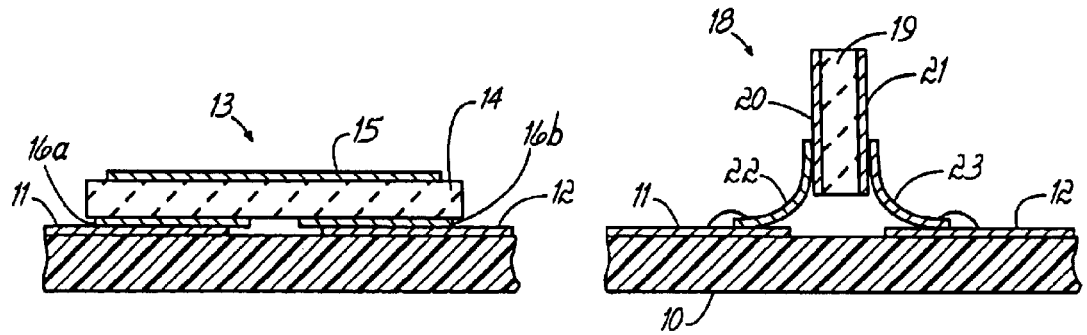
PRIOR ART
FIG. 1
PRIOR ART
FIG. 2
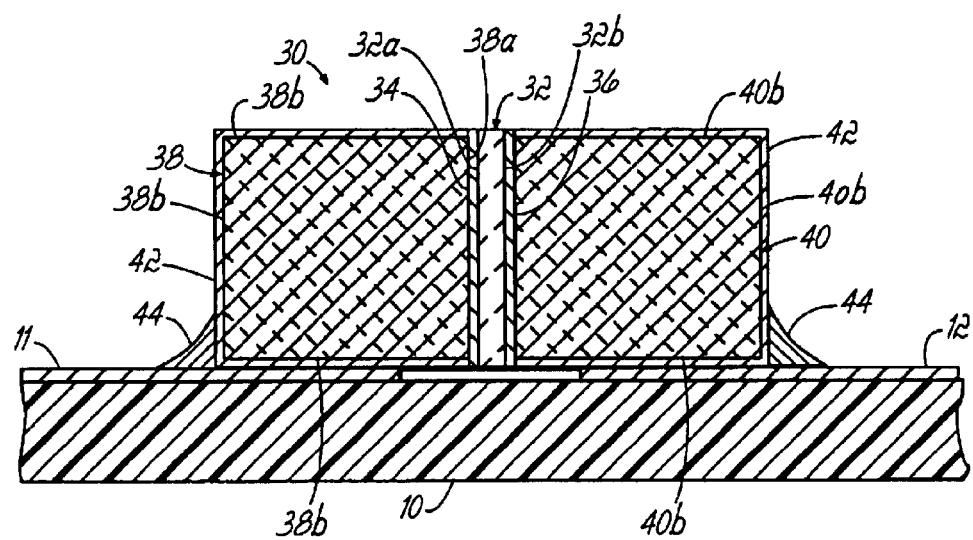
FIG. 3A
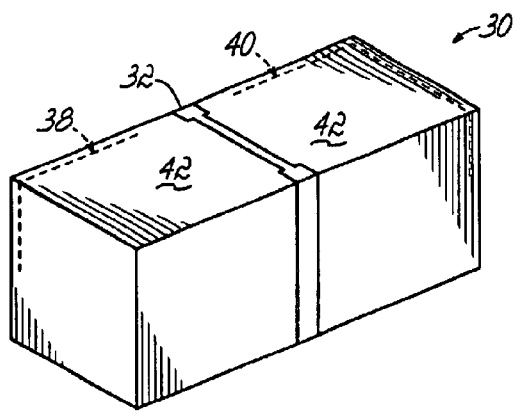
FIG. 3B

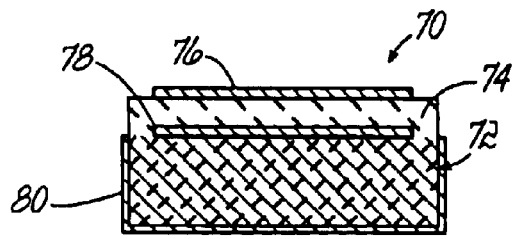
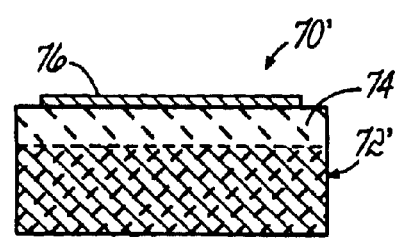
FIG. 9A            FIG. 9B
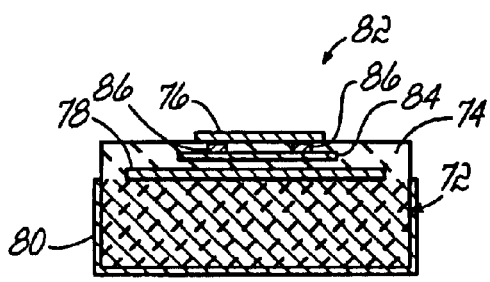
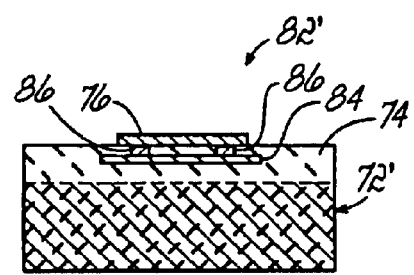
FIG. 10A           FIG. 10B
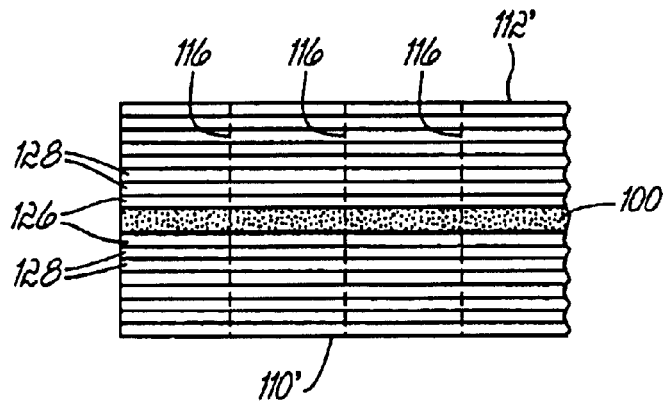
FIG. 13

SINGLE LAYER CAPACITOR

CROSS REFERENCE TO RELATED APPLICATION

This application is a continuation of U.S. patent application Ser. No. 10/188,696 filed Jul. 2, 2002. now U.S. Pat. No. 6,661,639 issued Dec. 9, 2003 and entitled SINGLE LAYER CAPACITOR, the disclosure of which is incorporated herein by reference in its entirety as if completely set forth herein below.

FIELD OF THE INVENTION

This invention relates to single layer capacitors, and in particular, surface mountable single layer capacitors and a method of making the capacitors.

BACKGROUND OF THE INVENTION

The "parallel plate" or "single layer" ceramic capacitor has a very useful form factor for assembly into microwave frequency and similar electrical circuits. These circuits may be laid out on printed circuit (pc) boards, or be present on integrated circuits (ICs) within chip carriers and other packages where space is typically even more precious. The dimensions of the ceramic capacitor can be matched to the width of a strip line on the pc board or the chip carrier holding an IC.

In assembly, the bottom face of the ceramic chip capacitor is typically soldered to or conductive epoxy attached to the surface of the pc board substrate. The top face of the ceramic capacitor normally presents one or more electrically conductive pads that are typically ribbon- or wire-bonded to another circuit connection point.

Most ceramic chip capacitors currently offered are made by metallizing two faces of a thin sheet of sintered ceramic that is typically in the range of 4 mils to 10 mils thick. The metallized ceramic sheet is then cut to size by sawing or abrasive cutting techniques. Typical sizes of the chip capacitors range from 10 mils square to 50 mils (inches) square, although some applications use rectangular forms.

While the form factor of these simple devices—used in quantities of hundreds of millions per year—is highly desirable, the amount of capacitance that can be achieved and quality of the devices realizing maximum capacitance is starting to limit their usefulness in certain applications. The simplified equation for the capacitance of a parallel plate capacitor, $c=KA/d$ where K is the dielectric constant, A the area of each of opposed plates, and d the distance of separation between plates, shows that a 20 mils square part (A) of 5 mils thickness (d) made from ceramic with a relative dielectric constant of 100 yields a capacitance of 8 picofarads.

This five mils thickness—necessitated in order to establish some structural strength for the given area size of, for example, 20 mils×20 mils—means that the capacitor does not have much structural strength, and is subject to undesirable fracturing or chipping during routine handling and assembly into circuits. Thus, the physical resistance to damage of the highest-capacitance "parallel plate" or "single layer" ceramic capacitors is innately poor. The design of single layer capacitors in general is a compromise between the use of thicker ceramic layers for greater strength and thinner ceramic layers for greater capacitance.

In addition to the difficulties in achieving high capacitance while maintaining structural strength, due to the small size of the capacitors, they are difficult to attach automatically to a pc board. One approach has been to use a flat, horizontal capacitor with the metallization on its lower side having a gap. A device of this type is referred to as the GAP-CAP™ manufactured by Dielectric Laboratories, Inc. A GAP-CAP™ device is shown in FIG. 1, mounted onto a pc board 10 in which metal traces 11 and 12 constitute a transmission line. The flat capacitor 13 is horizontally disposed to bridge the gap between the traces 11, 12. The capacitor 13 has a dielectric chip or slice 14 that is elongated in the horizontal direction, with a metallized upper surface 15 and metallized lower surface portions 16a and 16b, which are electrically joined to the traces 11 and 12, respectively. However, these devices can create unwanted resonances at frequencies above a few gigahertz. In addition, these capacitors are quite small, typically about 20–25 mils. At these sizes, the capacitors are difficult to handle, and must be installed using a microscope. The capacitor 13 has a definite top and bottom, and it is crucial to install them in the proper orientation, to avoid shorting the circuit. Thus, mounting of the capacitor is difficult and expensive. Also, the additional requirement of attaching metal leads may further contribute to prohibitive manufacturing costs.

Another approach has been to use a standing dielectric chip with opposed metallized surfaces, and with metal leads attached to the respective surfaces. A prior art standing leaded capacitor 18 is shown in FIG. 2 installed on the traces 11, 12 of the pc board 10. The capacitor is formed of a vertically-oriented ceramic chip 19 with metallized front and back surfaces 20, 21. There are flat metal leads 22, 23 affixed onto the metallized surfaces 20, 21 and these are soldered onto the metal traces 11, 12, respectively. The capacitor 18 has to be held in place while the leads 22, 23 are soldered to their respective places. The leads 22, 23 are fragile, and require extreme care in fabrication, shipping, handling and soldering in place to the traces 11, 12. Thus, the capacitors 18 have to be installed manually under a microscope, and robotized or automated circuit fabrication is difficult or impossible to obtain. In addition, the standing leaded capacitor 18 produces significant signal resonances, especially for frequencies above a few gigahertz.

It is desirable to provide a single layer capacitor that is surface mountable, thereby eliminating the requirement for wire bonding, which may be prohibitively expensive, and/or that can utilize a thin dielectric layer without sacrificing structural strength. A surface mountable capacitor is described in U.S. Pat. No. 6,208,501, wherein metal or metal-coated ceramic end blocks are soldered to a vertically-oriented dielectric chip sandwiched there between, whereby the end blocks serve as leads for attaching to metallic surface traces on the pc board. While the standing axial-leaded surface mount capacitor described in that patent is an improvement over the prior devices, the end blocks, which are described as 20–25 mils square blocks, must be manually assembled with the dielectric chip, which is a slow, intricate and expensive process subject to inaccurate alignment of the various components and to joint disattachment between the components during shipping and handling. For example, the block and/or metallization may pull away from the dielectric layer, causing the capacitor to open during use whereupon the capacitance will drop dramatically. In addition, the device described in that patent has a 20–25 mil width to match the width of a typical printed circuit trace. More specifically, the device is manufactured, for example, with a 50×20×20 mil size. However, at 40 gigahertz, the required trace width on the pc board is 10 mils wide. So at 40 gigahertz, the optimal chip size is 20×10×10 mil. The smaller the chip size, the more difficult and expensive it will be to mechanically assemble the end blocks to the dielectric chip. Moreover, in practice, only a limited range of capacitance values may be produced, thereby limiting the flexibility of the product to meet consumer demands.

There is thus a need to provide a surface mountable single layer ceramic capacitor that may be easily assembled and inexpensively manufactured, and that has high capacitance and good structural strength.

SUMMARY OF THE INVENTION

The present invention provides a monolithic or essentially monolithic single layer capacitor with good structural strength that may be easily and inexpensively manufactured, and which may utilize thin dielectric layers to provide high capacitance. To this end, sheets of green-state ceramic dielectric material and ceramic/metal composite material are laminated together, diced into individual chips, and fired to sinter the ceramic together. The composite material may comprise an amount of metal sufficient to render the composite conductive whereby the composite may be used for one or both electrodes and for mounting the capacitor to the pc board. Alternatively, the composite material may comprise an amount of metal insufficient to render the composite conductive but sufficient to act as seed points for an electroplating process wherein the composite is preferentially coated with conductive metal, and the coated composite is mounted to the pc board and the coating provides an electrical connection to an internal electrode. By the present invention, a capacitor is provided having a vertically-oriented dielectric between composite end blocks to provide a surface mountable capacitor which is monolithic or essentially monolithic. By the present invention a hybrid capacitor is also provided having a horizontally-oriented dielectric on a composite block mountable to the pc board and either a second composite block or a metallization on the dielectric for wire bonding to the pc board. By virtue of at least one composite block mountable to the pc board, a thin dielectric may be used while maintaining high structural integrity for the capacitor. Moreover, by assembling the portions of the capacitor in the green-state, and co-firing the assembly, a monolithic or essentially monolithic structure is formed having no preformed parts and containing no epoxy, glue, solder, or attachment means within the capacitor body thus further providing high structural integrity for the capacitor and simplifying the manufacturing process while allowing for further miniaturization of capacitors. The green-state method further provides flexibility that allows for a broad range of capacitor values to be obtained as desired by the consumer.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a cross-sectional view of a prior art flat capacitor.

FIG. 2 is a cross-sectional view of a prior art standing leaded capacitor.

FIG. 3A is a cross-sectional view of one embodiment of a surface mounted standing capacitor of the present invention having non-conductive composite end blocks plated with conductive metal.

FIG. 3B is a perspective view of the capacitor of FIG. 3A.

FIGS. 9A and 9B are cross-sectional views of alternative embodiments of a flat capacitor of the present invention, having a plated non-conductive end block and conductive end block, respectively.

FIGS. 10A and 10B are alternative embodiments of the capacitors of FIGS. 9A and 9B, respectively, each having a buried electrode.

FIG. 13 is a partial side view of an alternative array for forming a plurality of the capacitors of FIGS. 4A–4B in accordance with the exemplary method set forth in FIG. 11B.

DETAILED DESCRIPTION

Figure 4A:
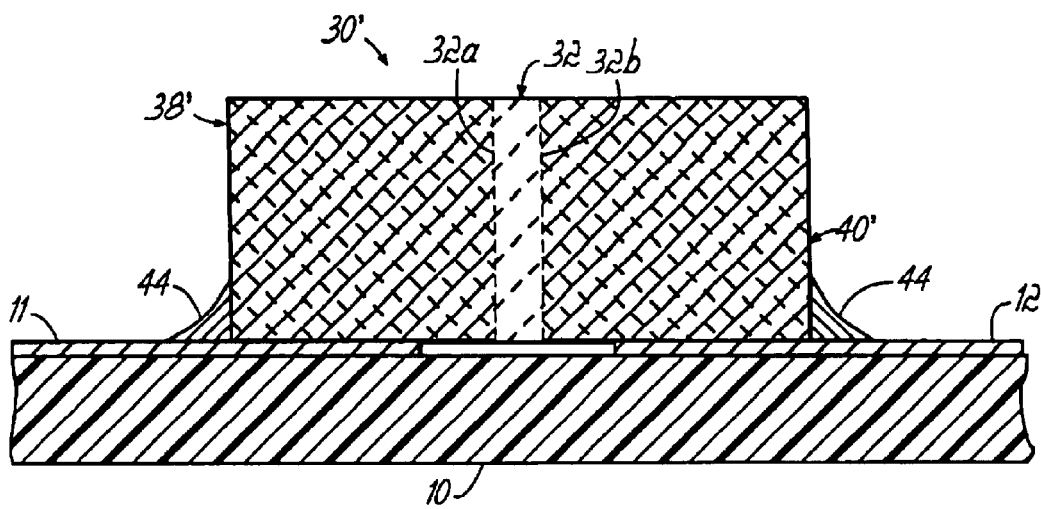
FIG. 4A is a cross-sectional view of another embodiment of a surface mounted standing capacitor of the present invention having conductive composite end blocks.

The present invention provides surface mountable single layer capacitors that may be easily assembled and inexpensively manufactured. The capacitors of the present invention may utilize thin dielectric layers to provide high capacitance without sacrificing structural strength. Structural strength is provided by composite end blocks that are either conductive or plated with conductive metal, which further serve as the electrodes or to electrically connect internal electrodes, or metallizations, of the capacitor to the metal surface traces on the pc board.

The capacitors of the present invention are manufactured starting in the green state. In one embodiment, a green-state ceramic dielectric sheet is metallized on both sides and placed between a pair of green-state composite metal/ceramic sheets. The sheets are laminated together, then the laminate is diced into a plurality of individual chips. The chips are then fired to sinter the ceramic material. The metallizations on the center dielectric layer, i.e., the internal electrodes, cover less than the entire area of the dielectric layer, extending to two opposing edges of the dielectric layer and falling short of the other two opposing edges. The ceramic dielectric layer and the ceramic portion of the composite end blocks sinter together at the edges where the metallization falls short, providing increased structural support to the capacitor by virtue of being an essentially monolithic structure. Lastly, the fired chip is electroplated with a conductive metal. The composite end blocks contain conductive metal, and the center dielectric layer does not contain metal. Thus, the composite end blocks will be preferentially plated due to the metal in the composite, and the pure ceramic of the dielectric layer will not plate. The resulting capacitor is a plated, essentially monolithic structure, meaning that it is an essentially solid structure of materials that are sintered together, thereby eliminating boundaries/joints within the structure and the structure contains no epoxy, glue, solder or other attachment means between layers. To state another way, monolithic is generally understood to refer to an object comprised entirely of one single piece (although polycrystalline or even heterogeneous) without joints or seams as opposed to being built up of preformed units. In the present invention, the only assembly occurs in the green state, and the individual capacitors obtained are sintered, monolithic or essentially monolithic structures. By "essentially" we refer to the presence of the internal metallizations that create a partial boundary or seam within the structure, but because the metallizations do not cover the entire area of the dielectric layer, the ceramic materials sinter together around the edges of the metallizations to essentially form a monolithic structure. Thus, by monolithic, we refer to the absence of a complete or continuous boundary or seam within the specified structure, with no boundary at all being completely monolithic and a partial boundary being essentially monolithic. The capacitors of the present invention are relatively easy to manufacture due to assembly occurring before dicing and firing the chips, which further allows for easy and accurate alignment of the components.

In another embodiment of the invention, the green-state dielectric sheet is placed between the pair of green-state composite metal/ceramic sheets without metallizations on the dielectric sheet. The metal content in the composite metal/ceramic sheets is sufficient to cause the composite to be conductive. The sheets are then laminated together, the laminate is diced into a plurality of individual chips, and the chips are fired to sinter the ceramic material. Because the composite end blocks are conductive, plating with conductive metal is unnecessary. The conductive composite end blocks function as the capacitor electrodes and are mountable on the printed metal traces on a pc board. This embodiment eliminates the need to print metallizations on the dielectric layer, and eliminates the need for plating the end blocks. The resulting capacitor is a monolithic structure, with the ceramic in the composite layers sintered together with the center ceramic dielectric layer to eliminate boundaries within the structure thereby providing structural integrity.

With reference to the drawings, in which like reference numerals are used to refer to like parts, FIG. 3A depicts in cross-sectional view a vertically-oriented, surface mountable, single layer capacitor 30 of the present invention. The standing or vertical capacitor 30 is provided having a vertically-oriented ceramic dielectric layer 32 with a metallization 34, 36 on each of substantially opposed coplanar surfaces 32a, 32b of the dielectric layer 32. As will be shown and described in further detail below, the metallizations 34, 36 do not cover the entire area of coplanar surfaces 32a, 32b. Metal/ceramic composite end blocks 38, 40 are adjacent respective metallizations 34, 36. Thereby, an internal face 38a, 40a of each end block 38, 40 is in contacting relation with a respective metallization 34, 36. The remaining faces 38b, 40b of the end blocks 38, 40, referred to as the external faces, are coated with a conductive metal 42. The coating 42 is provided by a plating technique, for example electroless plating, whereby the conductive metal preferentially plates to the composite end blocks due to the presence of the metal in the composite, which acts as seed points for the plating metal. The ceramic dielectric layer 32 does not receive the coating due to the absence of the metal within the material. The resulting capacitor 30 is shown in perspective view in FIG. 3B. Capacitor 30 has four-way symmetry that makes it possible to pick and place the capacitors mechanically without regard for the orientation, which allows the capacitor 30 to be positioned and soldered robotically. The end blocks 38, 40 can be soldered using solder 44 directly to printed metal traces 11, 12 on a pc board 10.

FIG. 4A depicts in cross-sectional view a vertically-oriented, surface mountable, single layer capacitor 30' of the present invention. The standing capacitor 30' is provided having a vertically-oriented ceramic dielectric layer 32. No metallizations need be provided to opposing surfaces 32a, 32b. Conductive metal/ceramic composite end blocks 38', 40' are adjacent respective opposing surfaces 32a, 32b. Due to capacitor 30' being cofired, the boundary between end blocks 38', 40' and dielectric layer 32 is essentially eliminated, as indicated in phantom, by sintering together the ceramic material, such that capacitor 30' is monolithic, as shown in perspective view in FIG. 4B. As with capacitor 30, capacitor 30' has four-way symmetry such that it may be positioned and soldered robotically without regard for orientation. Conductive end blocks 38', 40' can be soldered directly to printed metal traces 11, 12 on a pc board 10, thereby providing axial leads for the capacitor 30'.

In the embodiment depicted in FIGS. 3A and 3B, the end blocks 38, 40 comprise a composite metal/ceramic material in which particles of conductive metal are dispersed in a ceramic matrix. The metal particles provide seed points for the electroplating process, drawing the conductive metal 42 to the end blocks 38, 40 while allowing the ceramic gap 32 to remain un-coated. The metal particles may be in the form of a powder or flakes, for example. The powder or flakes are added to the ceramic, and the mixture is formed into a green-state tape or sheet, which may subsequently be assembled with the dielectric layer, diced, and hardened by cofiring the structure. Alternatively, the composite metal/ceramic material may comprise a ceramic powder wherein the particles are coated with the conductive metal, for example a ceramic coated with a palladium-silver alloy, and the coated powder is formed into a green-state tape or sheet, followed by assembly, dicing and firing.

Figure 4B:
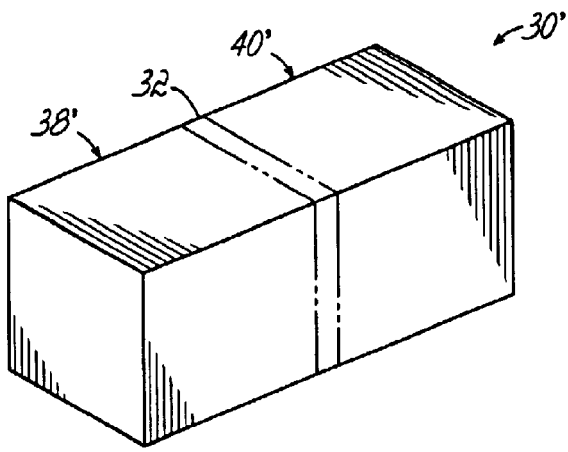
FIG. 4B is a perspective view of the capacitor of FIG. 4A.
Figure 5:
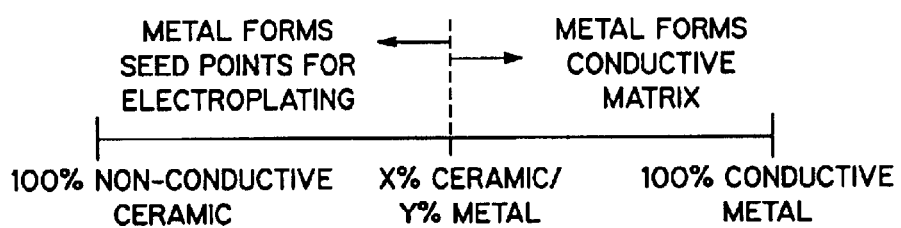
FIG. 5 is a graph illustrating the effect of composition on the conductivity of the composite end blocks that form a portion of the capacitors of the present invention.

In the embodiment depicted in FIGS. 4A and 4B, the end blocks 38', 40' comprise a composite metal/ceramic material in which the particles of conductive metal are present in an amount sufficient to render the composite matrix conductive. In general, the matrix becomes conductive when the metal particles start to touch. Referring to FIG. 5, the graph indicates that 100% ceramic is non-conductive and 100% metal is conductive. For composites between 100% ceramic and x % ceramic/y % metal, the metal content is insufficient to render the composite matrix conductive, but the metal will act as seed points for electroless plating of the end blocks 38, 40. For composites between x % ceramic/y % metal and 100% metal, the metal content is sufficient for the metal particles to touch each other, thereby rendering the composite matrix conductive. Electroplating is optional because end blocks 38', 40' are already conductive. The internal metallizations 34, 36 are also optional because the conductive end blocks 38', 40' are capable of serving as the electrodes for the capacitor.

The amount of metal sufficient to render the composite matrix conductive will vary depending mainly on the metal particle morphology. For example, y % will generally need to be higher for spherical powder metal than for metal flakes. The metal portion of the composite material advantageously comprises between about 10% and about 90% of the composite. If present in an amount less than about 10%, the content may be insufficient to establish seed points that allow the conductive metal 42 to preferentially plate the composite end blocks 38, 40. While an amount greater than about 90% may be used, the ceramic content is advantageously present in an amount sufficient to adhere the composite to the dielectric layer 32, and to control the sintering of the composite such that it more closely relates to the sintering of the dielectric layer 32. By way of example, using Ag flakes, where the Ag content of the composite is in the range of about 10% up to less than about 40%, the metal tends to act as seed points for the preferential plating of the end blocks 38, 40. Where the Ag content is at least about 40% up to about 90%, the entire composite matrix becomes conductive.

The conductive metal may be Ag, $AgNO_3$ or $AgCO_3$, for example. Alternatively, Cu and Ni and alloys thereof may be used, but these metal systems will generally require a reducing atmosphere. Pd, Pt, Au and alloys thereof may also be used, but these metal systems are generally more expensive than Ag-based systems. Advantageously, the ceramic material is an ultra-low firing ceramic, for example, one that fires around 900° C. An exemplary ceramic is a $BaTiO_3$ based ceramic. The metals generally used for the conductive metal portion of the composite generally sinter around 800° C. such that the ultra-low firing ceramic materials will be most compatible with the metal portion. Regardless, the ceramic material must sinter below the melting point of the metal. Advantageously, the ceramic material in the composite is the same as the ceramic material used for dielectric layer 32.

Figure 6:
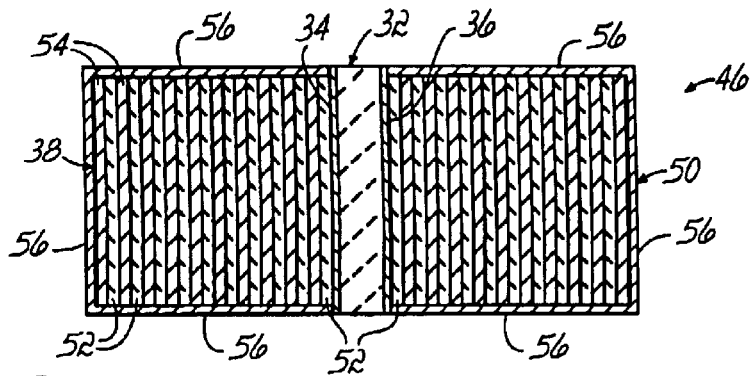
FIG. 6 is a cross-sectional view of another embodiment of a surface mounted standing capacitor of the present invention having non-conductive composite end blocks plated with conductive metal.

FIG. 6 provides an alternative embodiment in which a capacitor 46 of the present invention includes end blocks 48, 50 that comprise thin alternating layers of ceramic film 52 and metal film 54 whereby each ceramic film 52 in the end blocks 48, 50 is thin enough that electroplating will occur over the ceramic film from metal layer 54 to metal layer 54 to provide the conductive metal coating 56 on the end blocks 48, 50. Because the metal films 54 do not touch each other, the composite matrix will not be conductive, and thus, electroplating the end blocks 48, 50 is necessary. Advantageously, the layers adjacent the dielectric layer 32 are ceramic films 52 such that the ceramic film 52 sinters with the dielectric layer 32 in the unmetallized areas. While the metal films 54 technically create boundaries within the structure, the capacitor 46 is still considered essentially monolithic due to the absence of preformed parts that require epoxy, glue, solder or other attachments means between layers.

Figure 7A:
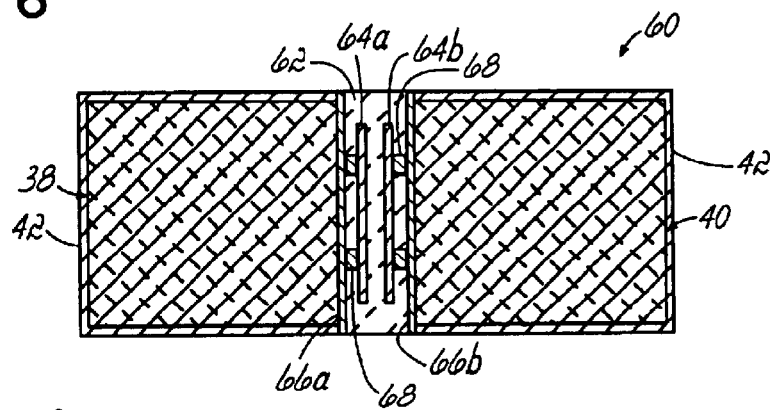
FIGS. 7A and 7B are alternative embodiments of the capacitors of FIGS. 3A and 4A, respectively, each having buried electrodes.
Figure 7B:
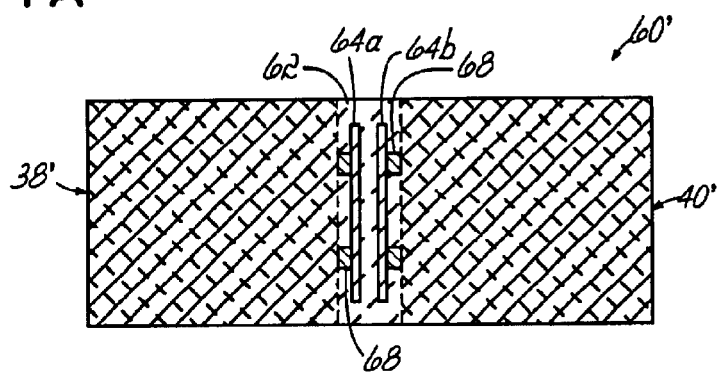

Another alternative embodiment is provided in FIGS. 7A and 7B, wherein capacitors 60 and 60', similar to capacitors 30 and 30', respectively, are provided having a dielectric layer 62 that includes buried electrodes. Specifically, for capacitor 60 as shown in FIG. 7A, a pair of internal buried electrodes 64a, 64b are provided within the dielectric layer 62, and connected to metallization areas 66a, 66b by a plurality of vias 68. Any number of vias 68 may be used providing that at least one via connects each buried electrode 64a, 64b to a respective metallization 66a, 66b. For capacitor 60' as shown in FIG. 7B, vias 68 connect the buried electrodes 64a, 64b to respective conductive end blocks 38', 40'. Advantageously, the buried electrodes 64a, 64b and vias 68 comprise the same metal as the metallizations 66a, 66b or end blocks 38', 40'. Use of the buried electrodes and vias enables variation of the capacitance of capacitors 60, 60'.

Figure 8:
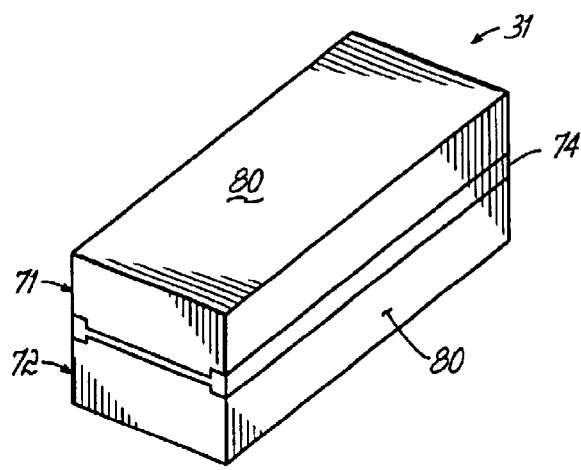
FIG. 8 is a perspective view of a hybrid flat capacitor in accordance with the present invention.

If desired, the same basic constructions used for capacitors 30, 30', 46, 60 and 60' may be used with different aspect ratios to create a horizontally-oriented hybrid capacitor 31, as shown in perspective view in FIG. 8. FIG. 8 depicts a horizontally-disposed capacitor chip 74 between top and bottom composite end blocks 71, 72 plated with conductive metal 80, wherein bottom end block 72 is mounted on the pc board 10 (not shown) and the top end block 71 is connected by wire bonding (not shown). Hybrid refers to the fact that the two electrodes of the capacitor 31 are electrically connected to the pc board by two different methods. While the horizontally-oriented capacitor 31 requires wire bonding, the capacitor 31 is still symmetrical, allowing for its placement on the pc board 10 without regard for orientation, thereby representing an advantage over prior art wire-bonded capacitors. Moreover, due to the presence of the composite material end blocks 71, 72, the dielectric layer 74 may be made thinner without sacrificing the structural integrity of the capacitor 31.

While FIG. 8 depicts in perspective view a horizontally-disposed capacitor chip 74 between top and bottom composite end blocks 71, 72, it may be appreciated that the top end block 71 may be eliminated, for example as shown in FIGS. 9A and 9B. FIG. 9A depicts a horizontally-disposed hybrid capacitor 70 with a single composite block 72 for mounting directly on the pc board 10. The dielectric layer 74 is oriented horizontally with respect to the pc board 10 and disposed on top of the composite block 72. Dielectric layer 74 has metallization areas 76, 78 on opposing surfaces wherein the top metallization 76 is adapted to be wire-bonded to the pc board 10 and the bottom metallization 78 is electrically connected to the metal surface traces 11, 12 on the pc board 10 by the conductive metal coating 80 on the exterior surfaces of the composite block 72. FIG. 9B depicts a similar horizontally-disposed hybrid capacitor 70' with a single conductive composite block 72'. The dielectric layer 74 has a top metallization 76, but no bottom metallization is needed because the composite block 72' functions as the electrode.

Capacitors 82 and 82' in FIGS. 10A and 10B, respectively, are similar to capacitors 70 and 70' in FIGS. 9A and 9B, but further include a buried electrode 84 in the dielectric layer 74, electrically connected to the top metallization 76 by a plurality of vias 86. In the hybrid capacitor embodiments of FIGS. 8, 9A–9B and 10A–10B, while wire bonding is still required to make the electrical connection to the upper metallization 76, the composite block 72 provides structural support thereby enabling a thinner dielectric layer 74 and thus a high capacitance.

The method of the present invention provides an accurate, easy and inexpensive means for assembling a capacitor of the present invention. The method begins with all portions of the capacitor in the green state, i.e., the unfired state. One exemplary embodiment of the method of the present invention may be further understood with reference to the flowchart of FIG. 11A and the perspective views of FIGS. 12A and 12B. FIG. 12A depicts the assembly of green sheets of material from which a plurality of capacitors may be formed by dicing and firing the sheets. The exemplary method is described with reference to the manufacture of capacitor 30 of FIGS. 3A and 3B. A green-state (unfired) ceramic sheet or tape 100 is provided to form the dielectric layer 32. By way of example and not limitation, the ceramic tape 100 may be on the order of 2–5 mil thick. The top and bottom opposing faces 101a, 101b of the ceramic sheet 100 are metallized with a conductive metal capable of functioning as the electrodes for the capacitor chip. The metallizations may be provided in spaced strips 102, 104 extending to opposing edges 106, 108 of the dielectric sheet 100 depicted in FIG. 12A. The dielectric sheet 100 having the metallizations 102, 104 on opposing faces 101a, 101b is placed upon a green-state (unfired) ceramic/metal composite sheet 110 such that the dimensions of the composite sheet 110 are substantially equal in length and width to the corresponding dimensions of the ceramic sheet 100, and the two sheets are substantially aligned, as depicted in FIG. 12A. The metallizations 104 are in contact with the composite sheet 110. A second green-state (unfired) ceramic/metal composite sheet 112 is then placed on the dielectric sheet 100 whereby metallizations 102 are in contact with the composite sheet 112. Again, the composite sheet 112 has dimensions substantially equal to the ceramic sheet 100 and the sheets are aligned. Composite sheets 110 and 112 will form the end blocks 38, 40 of capacitor 30, which in this embodiment, do not contain sufficient metal content to render the matrix conductive. By way of example and not limitation, the composite sheets 110, 112 may have a thickness on the order of 10–20 mil. By way of further example and not limitation, using 5×5×0.02 inch composite sheets, 40,000 capacitors having 20×20 mil square end blocks may be fabricated.

Figure 12A:
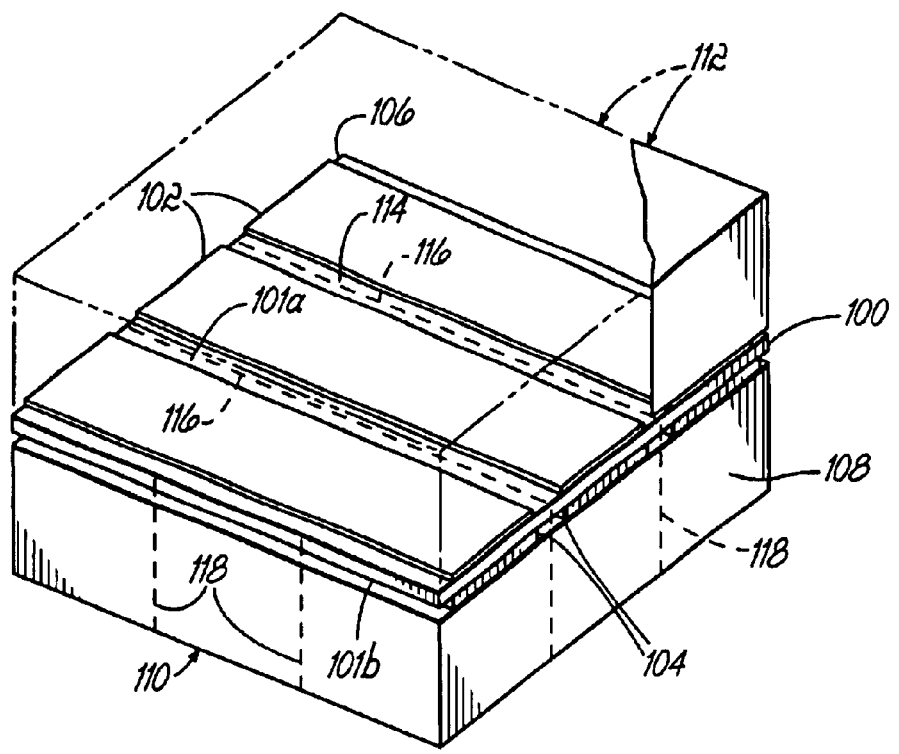
FIG. 12A is a perspective view of a partially assembled array for forming a plurality of the capacitors of FIGS. 3A–3B in accordance with the exemplary method set forth in FIG. 11A.
Figure 12B:
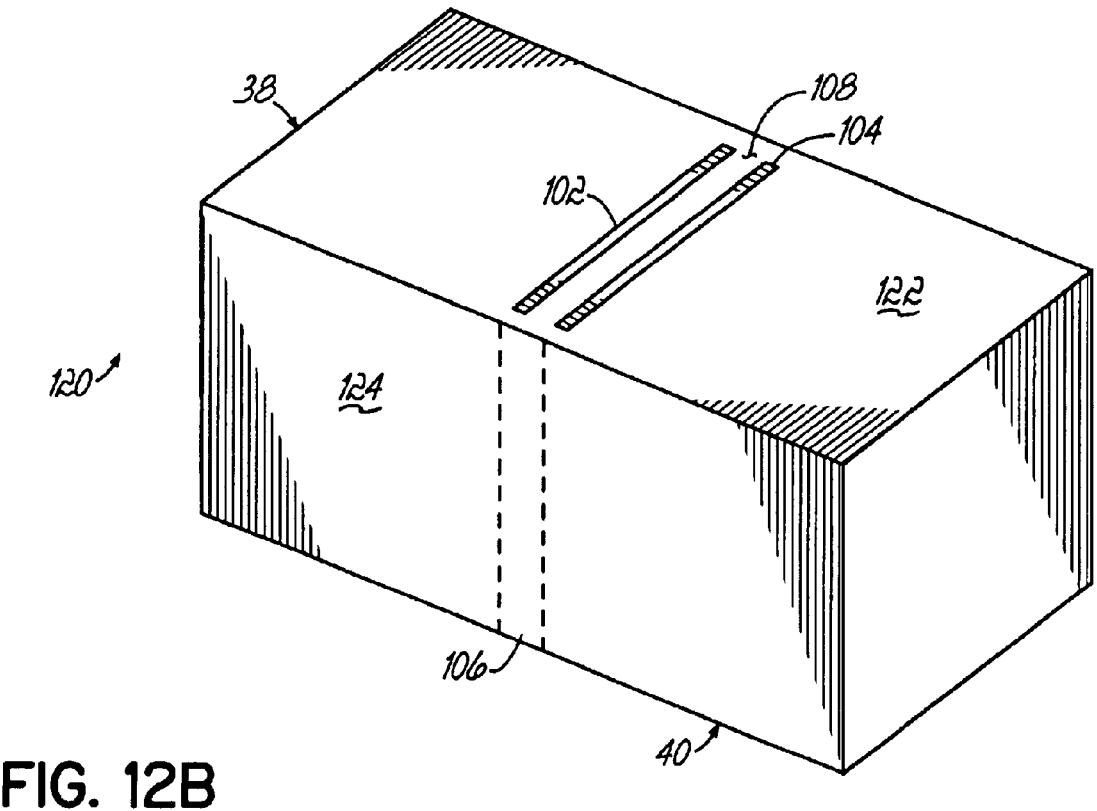
FIG. 12B is a perspective view of a partially formed capacitor of the present invention made by the method set forth in FIG. 11A.

The composite sheets 110, 112 with the dielectric sheet 100 there between are then laminated together, such as by isostatic pressing. The laminate is then diced into individual chips, by first cutting along the spaces 114 between the metallization strips 102, 104 along cut lines 116, and then crosswise along cut lines 118, or vice versa. The cut lines 116, 118 may be adjusted to form square or rectangular dimensions. For example, the cut lines 116, 118 may be adjusted such that each composite sheet 110, 112 is cut to form a 10×10 mil block or a 20×20 mil block. The individual chips formed by dicing are then fired to sinter the ceramic materials together. As shown in FIG. 12B, after sintering, the composite top sheet 112 forms end block 38 and composite bottom sheet 110 forms end block 40. The metallizations 102, 104 are visible on face 122 of the fired chip 120, which corresponds to edge 108 in FIG. 12A to which the metallized strips 102, 104 extended. Adjacent face 124 shows in phantom where the separation between the composite sheets 110, 112 and the center ceramic sheet 100 were prior to firing, but after firing, the ceramic fuses together from one layer to another, essentially eliminating the boundaries there between. Because the cutting line 116 was intermediate the strips 102, 104, the metallizations 102, 104 do not extend to the edge of face 124 and thus are not visible at the surface. As a result, structural integrity is provided to chip 120 by the ability of the ceramic to fuse together around the edges of the metallizations 102, 104 to form an essentially monolithic structure.

The fired chip 120 in FIG. 12B has internal electrodes 102, 104, but provides no available connection from the internal electrodes to metal surface traces 11, 12 on a pc board 10. Thus, the fired chip 120 is electroplated with a conductive metal, such as copper or nickel, whereby the metal in the composite end blocks 38, 40 causes the end blocks to be preferentially plated with the conductive metal, as are the electrodes 102, 104 on surface 122, to form coating 42 on the external faces 38b, and the center dielectric portion 32 remains un-plated due to the absence of a metal component in that material. After the plating step, capacitor 30, as depicted in FIGS. 3A and 3B, is provided.

Figures 11A, 11B:
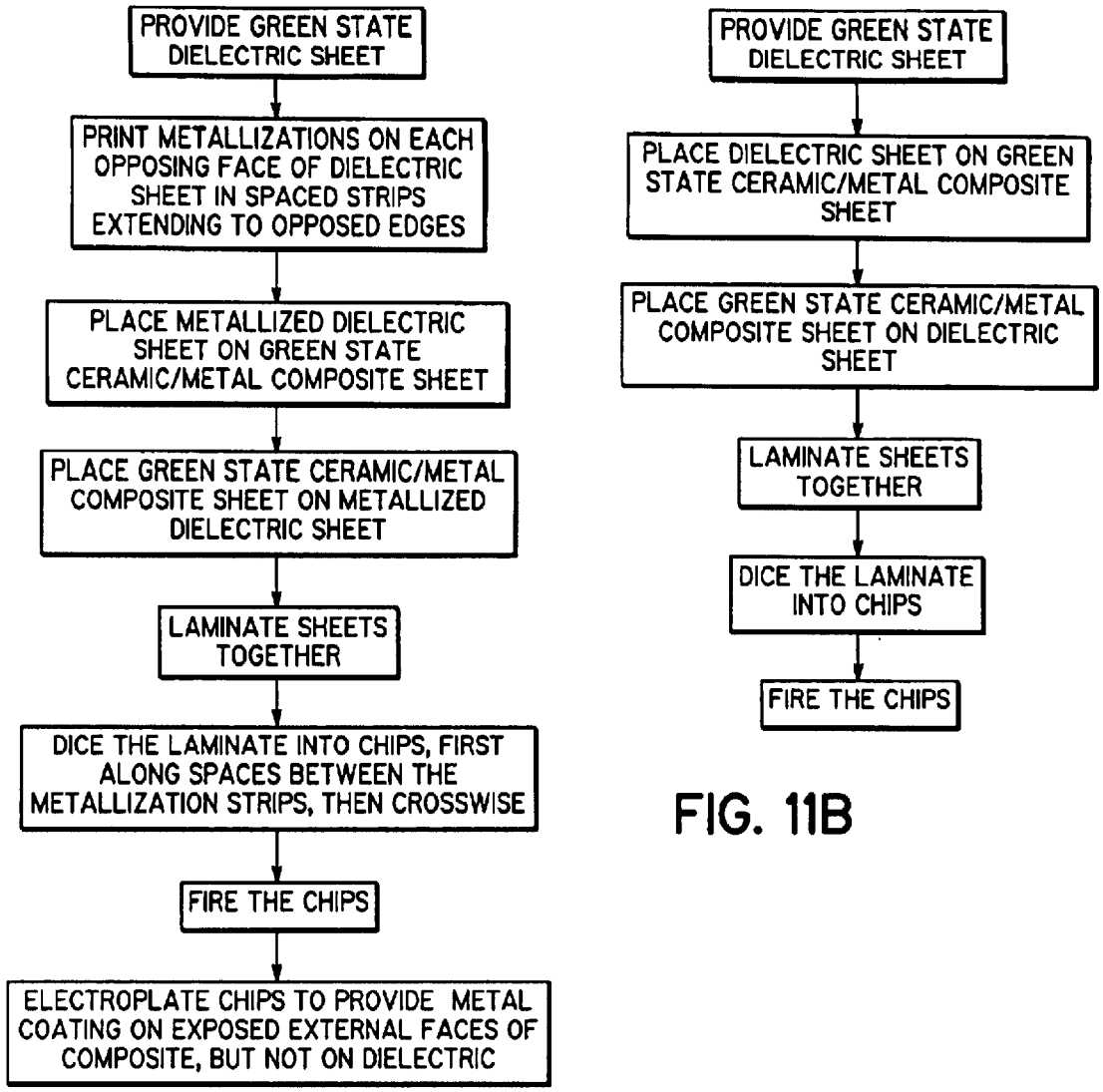
FIG. 11A is a flow chart setting forth an exemplary method in accordance with the present invention for fabricating the capacitor of FIGS. 3A–3B.
FIG. 11B is a flow chart setting forth an exemplary method in accordance with the present invention for fabricating the capacitor of FIGS. 4A–4B.

Another exemplary embodiment of the method of the present invention may be further understood with reference to the flowchart of FIG. 11B and the side view of FIG. 13. The exemplary method is described with reference to the manufacture of capacitor 30' of FIGS. 4A and 4B. A green-state (unfired) ceramic sheet or tape 100 is provided to form the dielectric layer 32, as in the previous embodiment, but the top and bottom opposing faces are not metallized. The dielectric sheet 100 is placed upon a green-state (unfired) ceramic/metal composite sheet 110' such that the dimensions of the composite sheet 110 are substantially equal in length and width to the corresponding dimensions of the ceramic sheet 100, and the two sheets are substantially aligned. A second green-state (unfired) ceramic/metal composite sheet 112' is then placed on the dielectric sheet 100, and again, the composite sheet 112' has dimensions substantially equal to the ceramic sheet 100 and the sheets are aligned. Composite sheets 110' and 112' will form the end blocks 38', 40' of capacitor 30', which in this embodiment, contain sufficient metal content to render the matrix conductive.

The composite sheets 110', 112' with the dielectric sheet 100 there between are then laminated together, such as by isostatic pressing. The laminate is then diced into individual chips, by first cutting along cut lines 116, and then crosswise (not shown), or vice versa. The individual chips formed by dicing are then fired to sinter the ceramic materials together. After sintering, the composite top sheet 112' forms end block 38' and composite bottom sheet 110' forms end block 40' and the ceramic fuses together from one layer to another, essentially eliminating the boundaries there between, as shown in phantom in FIG. 4B to form a monolithic structure. Because the end blocks 38', 40' are conductive, no plating is necessary, as the end blocks serve as the electrodes and provide the connection to metal surface traces 11, 12 on a pc board 10.

In one embodiment of the invention, further depicted in FIG. 13, the composite sheets 110', 112' may comprise a plurality of layers 126, 128 of cast tape placed one on top of another, wherein the majority of layers 128 are metal, preferably with at least some ceramic content, and the layers 126 adjacent the ceramic sheet 100 are either glass/metal or ceramic/metal with sufficient glass or ceramic content to fuse with the ceramic sheet 100 during the sintering step. Thus, the end blocks 38', 40' need not have a homogenous composition throughout, but need only have sufficient non-metal content adjacent the ceramic dielectric layer 32 to fuse together with layer 32 to form a monolithic structure.

Variations on the above-described methods may be made, as understood by one skilled in the art, to fabricate the alternative embodiments described herein. For example, for the embodiments of FIGS. 9A and 10A, one of the steps in the method of FIG. 11A of placing a green-state composite sheet adjacent the metallized dielectric sheet may be eliminated because only one composite block 72 is to be formed. Further, the metallizations on one of the opposing faces may be a blanket metallization or any desired pattern for forming the top electrodes 76, and thus, is not limited to the spaced strips used to form metallizations 78. Additionally, the metallization 76 may be printed on the chip after or before firing the chips. By way of further example, for the embodiments of FIGS. 9B and 10B, one of the steps in the method of FIG. 11B of placing a green-state composite sheet adjacent the dielectric sheet may be eliminated because only one conductive composite block 72' is to be formed. In yet another example, the dielectric sheet may be provided with buried electrodes and metal filled vias in accordance with the same or similar techniques as that set forth in commonly-owned, copending application Ser. No. 09/875,347 entitled CERAMIC CHIP CAPACITOR OF CONVENTIONAL VOLUME AND EXTERNAL FORM HAVING INCREASED CAPACITANCE FROM USE OF CLOSELY SPACED INTERIOR CONDUCTIVE PLANES RELIABLY CONNECTING TO POSITIONALLY TOLERANT EXTERIOR PADS THROUGH MULTIPLE REDUNDANT VIAS filed on Jun. 6, 2001, and incorporated by reference herein in its entirety.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicants' general inventive concept.

What is claimed is:

1. A capacitor comprising an essentially monolithic structure of at least one composite portion sintered with a ceramic dielectric portion, wherein the at least one composite portion includes a ceramic and a conductive metal in an amount sufficient to render the at least one composite portion conductive, and wherein the ceramic dielectric portion is horizontally disposed with the at least one composite portion sintered to a bottom portion thereof, the at least one composite portion adapted to be mounted onto a pc board, and the capacitor further comprising a metallization on a top portion of the ceramic dielectric portion, the metallization adapted to be wire bonded to a pc board, and a buried horizontally-oriented metallization in the dielectric portion and at least one conductive metal-filled via extending from the buried metallization to the at least one composite portion.

2. The capacitor of claim 1 wherein the at least one composite portion comprises glass sintered with the ceramic dielectric portion.

3. The capacitor of claim 1 wherein the at least one composite portion comprises a matrix of the ceramic, and particles of the conductive metal are dispersed in the matrix, and wherein the conductive metal particles comprise about 40–90% of the composite portion.

4. A capacitor comprising an essentially monolithic structure of at least one composite portion cosintered with a ceramic dielectric portion, wherein the at least one composite portion includes a ceramic and a conductive metal in an amount sufficient to render the at least one composite portion conductive, and wherein the ceramic dielectric portion is horizontally disposed with the at least one composite portion cosintered to a bottom portion thereof, the at least one composite portion adapted to be mounted onto a pc board, and the capacitor further comprising a metallization on a top portion of the ceramic dielectric portion, the metallization adapted to be wire bonded to a pc board.

5. The capacitor of claim 4 wherein the at least one composite portion comprises glass sintered with the ceramic dielectric portion.

6. The capacitor of claim 4 wherein the at least one composite portion comprises a matrix of the ceramic, and particles of the conductive metal are dispersed in the matrix, and wherein the conductive metal particles comprise about 40–90% of the composite portion.

7. The capacitor of claim 4 wherein the ceramic dielectric portion is free of internal metal electrodes.

8. The capacitor of claim 4 wherein the at least one composite portion has a thickness of about 10–20 mil and the ceramic dielectric portion has a thickness of about 2–5 mil.

9. A surface mountable, monolithic capacitor comprising:
a center vertically-oriented ceramic dielectric portion having opposed vertical coplanar surfaces;
a pair of composite electrode end portions comprising a ceramic and a conductive metal in an amount sufficient to render the composite conductive, each end portion having an internal vertical face and a plurality of external faces, each internal vertical face co-sintered to a respective opposed vertical coplanar surface of the center ceramic dielectric portion so as to have essentially no boundary therebetween, whereby the conductive end portions serve as electrodes for the capacitor and are directly mountable on metallic surface traces on a printed circuit board.

10. The capacitor of claim 9 wherein the composite end portions comprise a matrix of the ceramic, and particles of the conductive metal are dispersed in the matrix, and wherein the conductive metal particles comprise about 40–90% of the composite end portions.

11. The capacitor of claim 9, wherein the composite end portions adjacent the internal vertical faces further comprise glass.

12. The capacitor of claim 9 wherein the conductive metal comprises about 90% of the composite end portions.

13. The capacitor of claim 9 further comprising at least one buried vertically-oriented metallization in the center ceramic dielectric portion intermediate the opposed coplanar surfaces, and having at least one metal-filled via extending from the buried metallization to one of the composite end portions.

14. The capacitor of claim 9 wherein the composite end portions comprise glass sintered with the ceramic dielectric portion.

15. The capacitor of claim 9 wherein the ceramic dielectric portion is free of internal metal electrodes.

16. A surface mountable, monolithic capacitor comprising:
a center horizontally-oriented ceramic dielectric portion having opposed horizontal coplanar surfaces;
top and bottom composite electrode portions comprising a ceramic and a conductive metal in an amount sufficient to render the composite conductive, each composite electrode portion having an internal horizontal face and a plurality of external faces, each internal horizontal face co-sintered to a respective opposed horizontal coplanar surface of the center ceramic dielectric portion so as to have essentially no boundary therebetween, whereby the conductive electrode portions serve as electrodes for the capacitor and the bottom electrode portion is directly mountable on a metallic surface trace on a printed circuit board.

17. The capacitor of claim 16 wherein the ceramic dielectric portion is free of internal metal electrodes.

18. The capacitor of claim 16 wherein the composite electrode portions comprise glass sintered with the ceramic dielectric portion.

19. The capacitor of claim 16 wherein the composite electrode portions comprise a matrix of the ceramic, and particles of the conductive metal are dispersed in the matrix, and wherein the conductive metal particles comprise about 40–90% of the composite electrode portions.

20. The capacitor of claim 16 wherein the composite end portions adjacent the internal horizontal faces further comprise glass.

21. The capacitor of claim 16 wherein the conductive metal comprises about 90% of the composite end portions.

* * * * *